INVENTOR
ERNEST K. HALEY
BY David H. Semmes
ATTORNEY

United States Patent Office 3,529,496
Patented Sept. 22, 1970

3,529,496
MULTIPLE DRILL SPINDLE SHIFTING MECHANISM
Ernest K. Haley, 134 NW. Parkway,
Louisville, Ky. 40206
Continuation-in-part of application Ser. No. 733,657,
May 31, 1968. This application July 30, 1969, Ser.
No. 845,964
Int. Cl. B23b 39/18
U.S. Cl. 77—24
10 Claims

ABSTRACT OF THE DISCLOSURE

A drill spindle shifting mechanism of the type used in supporting a plurality of drill chucks for driving simultaneously a plurality of holes through a work piece such as a steel beam and including a plurality of spindle blocks supporting the chucks and movable laterally with respect to each other, so as to vary the distances between holes being drilled. The blocks are supported upon a pair of lateral adjusting rods which, upon being rotated, move the blocks laterally and simultaneously with respect to each other.

CROSS-REFERENCES TO RELATED APPLICATIONS

An improvement upon the drill spindle shifting structure disclosed in applicant's earlier filed: Multiple Head Drilling Apparatus (Ser. No. 733,657), filed May 31, 1968.

BACKGROUND OF THE INVENTION

Field of the invention

A major problem in the steel fabrication industry occurs in the simultaneous drilling of multiple holes in steel piecework, such as girders, I-beams, and the like. Earlier inventors have attempted to provide devices for supporting a plurality of drilling chucks. However, the individual chucks are required to be adjusted manually by means of slotted dies. This adjustment is both time-consuming and insecure, the chucks requiring frequent readjustment during the drilling operation.

Description of the prior art

Prior art multiple head drilling devices suggest means for laterally adjusting a plurality of drilling chucks. Conventionally, these chunks are adjusted individually, manually, by means of slotted dies, individual slip joints being employed intermediate the drive mechanism and the chucks. A principal shortcoming of these devices is their inability of supporting the chucks longitudinally during drilling or providing a positive drive which can economically withstand maximum wear.

Nutting (734,082) is the earliest concept of a multiple drill head having both vertical and lateral adjusting features. Note that Nutting employs a threaded cross rail as the adjusting mechanism. Fox (1,058,045) and Gesko (3,290,966) employ slip joints, substantially as proposed by applicant. Scott (1,097,678) imparts radial adjustability of the joints with respect to a common center. Gwyer (1,340,953) on the other hand provides circumferential adjustability by means of arcuate, rather than radial extending, slots. Brainard (3,124,017) employs conventional slotted support arms 36–45 for imparting adjustability of the drilling heads.

SUMMARY OF THE INVENTION

According to the present invention, a plurality of spindle blocks supporting individual drilling chucks are mounted movably upon a pair of lateral adjusting rods. The lateral adjusting rods are gear meshed with respect to each other and include slidable adjustment sleeves having both left-hand and right-hand threads engaging adjacent blocks. The adjustment sleeves are staggered vertically so that each spindle block engages a top sleeve threaded in one direction and a bottom sleeve threaded in another direction. As one adjusting rod is rotated, the other rod is rotated in the opposite direction, with the result that the opposed threads engaging each spindle block drive the block laterally and securely in one lateral direction. The distances between the spindle blocks may be readjusted instantly by again rotating the adjusting rods in either direction. Since each spindle block is supported upon sleeves having opposed threads, there is provided a positive support of the block during the drilling operation.

DESCRIPTION OF THE PREFERRED EMBODIMENTS

Figure 1:
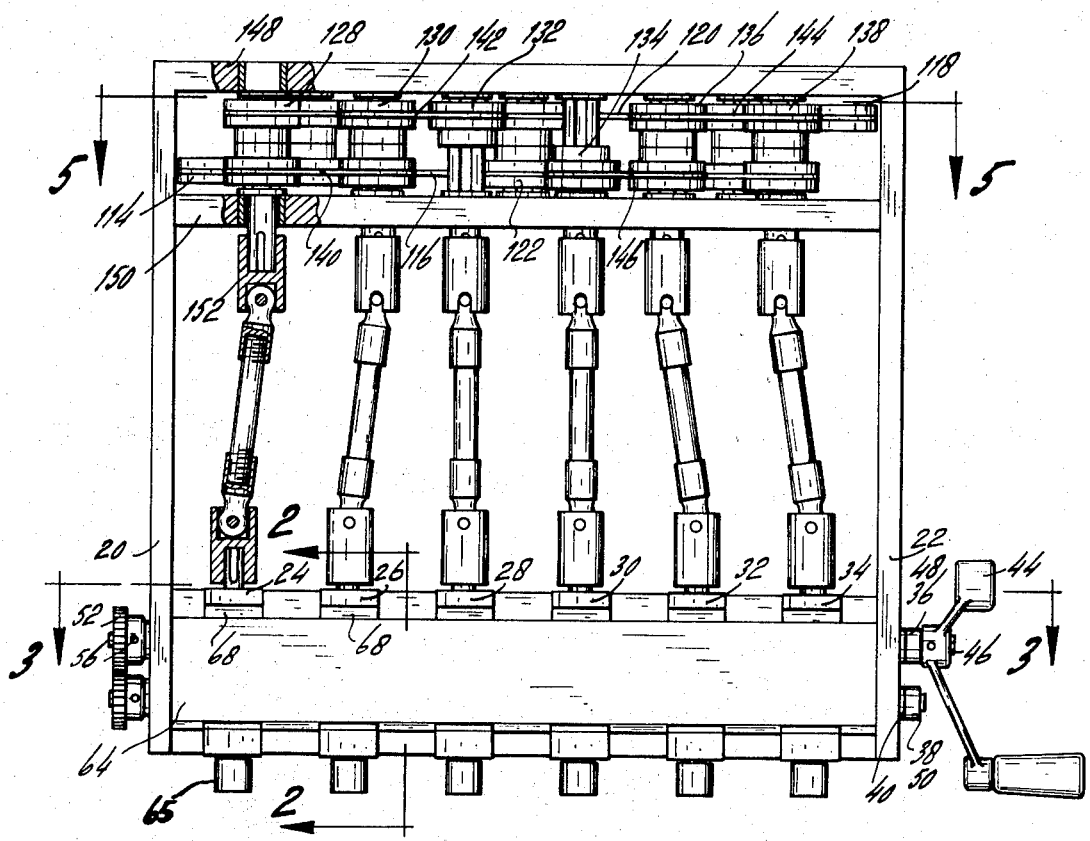
FIG. 1 is a front elevation of a proposed multiple head drilling apparatus having six drilling chucks and six corresponding spindle blocks.

In FIG. 1, there is illustrated the proposed arrangement where six identical spindle blocks 24, 26, 28, 30, 32, and 34 are laterally adjustably supported in a transverse adjusting channel by means of a dovetail relationship with front support plate 64 and back support plate 62 and their respective bearing surfaces 68 and 66. A pair of lateral adjusting rods 36 and 38 extend through the side plates 20 and 22 and are rotatably mounted therein by means of identical bushings 40. The rods are geared to each other in a 1–1 ratio by means of spur gears 52 and 54. Gears 52 and 54 may be keyed to the ends of shafts 36 and 38 and locked thereon by means of a set screw 56 or the like.

Figure 2:
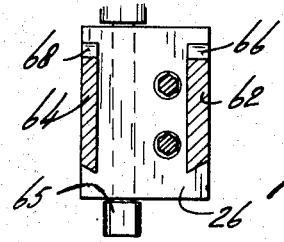
FIG. 2 is an end elevation of a single spindle block supported in dovetail relationship upon the front and back support plates.
Figure 3:
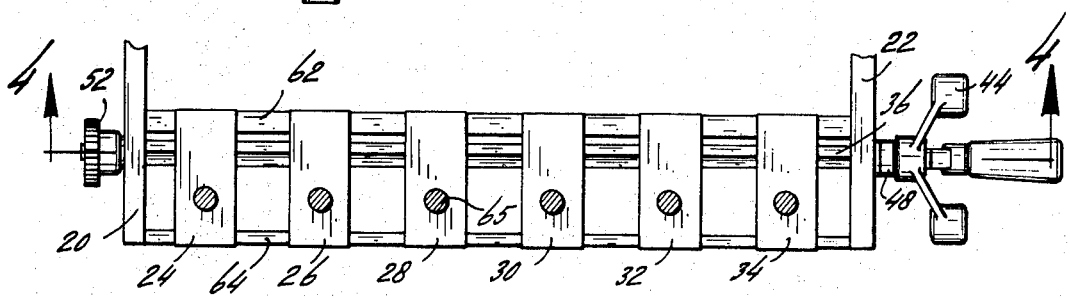
FIG. 3 is a top plan of the spindle block.
Figure 5:
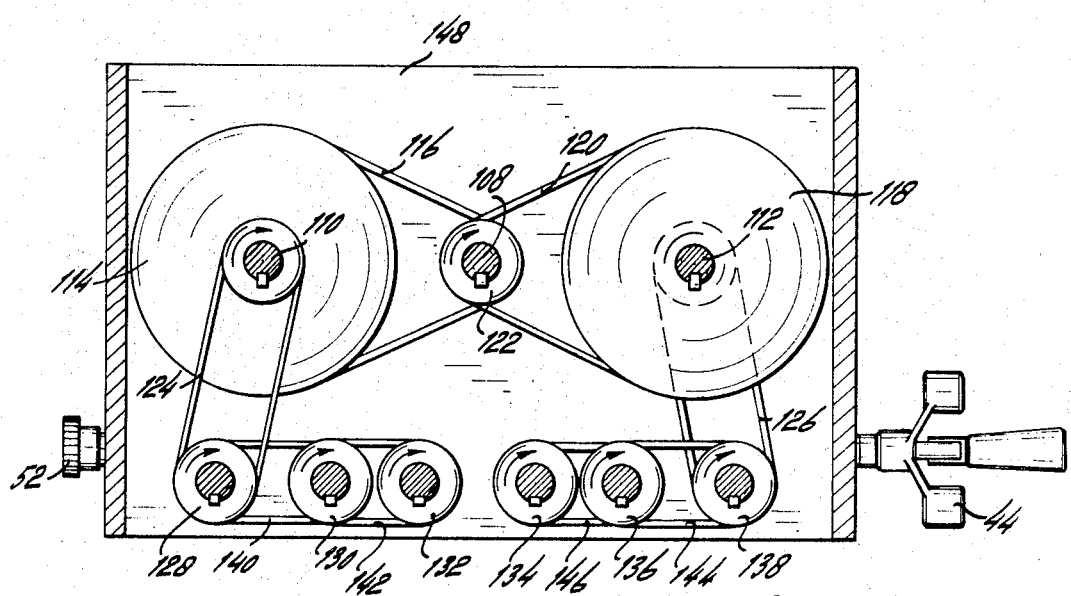
FIG. 5 is a top plan of a chuck driving mechanism, according to FIG. 1.

Individual drilling chucks 65 extend through the front of the blocks in the channel indicated in phantom in FIG. 2 and are driven by the slip joint mechanism illustrated in FIG. 1. As illustrated in FIGS. 1 and 5, the individual motor drive assembly comprises a drive motor (not illustrated) having drive shaft 108 extending upwardly to engage drive pulley or sprocket 122. Laterally disposed jack shafts 110 and 112 support chain pulleys 114 and 118 which are operatively connected, respectively, via chains 6 and 20 to drive sprocket 22. Pulley 114 in turn by means of chain 124 is connected to driving sprocket 128. Pulley 118 is connected to driving sprocket 138 by means of chain 126. Driving sprockets 128 and 130 are connected by means of chain 140 and sprockets 130 and 132 are connected by means of chain 142.

Sprockets 138 and 136 are connected by means of chain 144 and sprockets 136 and 134 are connected by means of chain 146. Thus, as motor drive shaft 108 rotates, the individual drive sprockets cause rotation of chucks 65 via universal joint means 152. The drive sprockets and pulleys may be mounted intermediate plates 148 and 150.

Figure 4:
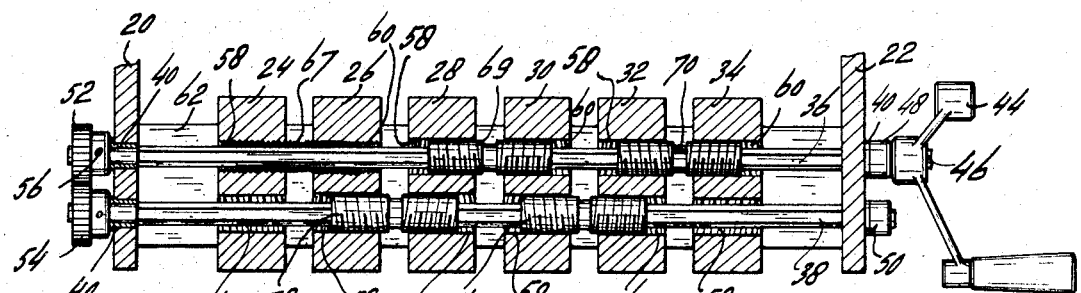
FIG. 4 is a transverse sectional view, taken along section line 4—4 of FIG. 2, showing the positioning of the six spindle blocks upon the top and bottom lateral adjusting rods and the threaded adjustment sleeves.

As illustrated in FIG. 4, the lateral adjusting rods 36 and 38 have mounted thereon a plurality of identical adjustment sleeves 67, 69, 70, 72, and 74. Each adjusting sleeve has right-hand threads at one end and left-hand threads at the other end. The sleeves are mounted to vertically staggered relationship so that each spindle block engages a thread of one type in its top threaded channel and a thread of another type in its bottom threaded channel. In this respect, note block 26 having left-hand threads in its channel top, engaging left-hand thread 60 of sleeve 67 and right-hand threads in its bottom, engaging sleeve 72 right-hand threads 58 in its bottom threaded channel. Turning of shaft 36 by crank handle 44, keyed thereon as at 46, in a clockwise direction results in counterclockwise turning of shaft 38. Counter rotation of these shafts results in lateral movement of each of the spindle blocks upon the threaded sleeves.

The outer spindle blocks 24 and 34 in their bottom threaded channels engage respectively peripheral left-hand thread 60' and right-hand thread 58' which provide a measure of vertical support of the spindle block.

As illustrated, spindle block 24 is fixed or anchored in position. By turning the crank 44 and shaft 36, driving through 1–1 ratio gears and turning shaft 38 in the opposite direction, one can adjust the spacing of the spindle blocks and maintain equal and accurate centers.

Each spindle block has two threaded channels—one left-hand and one right-hand. The adjustment sleeves are threaded left-hand on one end and right-hand on the other end. The adjustment sleeves are broached to a sliding fit on shafts 36 and 38. Lateral movement is produced by left and right-hand threads working in unison with the added feature of the adjusting sleeve being able to slide along the shaft.

Turning the crank and shaft 36 clockwise turns the adjusting sleeves between blocks 24–34, bringing these pairs of blocks together equally and in unison. The rotation of shaft 36 powering the 1–1 ratio gears 52–54 turns shaft 38 in the direction opposite to shaft 36 (counterclockwise). Shaft 38 turning the adjusting sleeves between blocks 26, 28, 30, and 32 brings these pairs of blocks together, equally and in unison.

Since the ratio between the shafts is the same, the adjustment shafts will turn the same amount and the six spindle blocks will move an equal distance and in unison with each other.

The shafts illustrated are hexagonal, but square or octagonal shafts may be used. The initial assembly spacing of the blocks is improved by using hex or octagonal shafting with 1"–8 n.c. threads on the adjusting sleeve. Using a square shaft, the center distances could vary $\frac{1}{32}$", with hex the variation could be $\frac{1}{48}$", and with octagonal shafts the variation could be $\frac{1}{64}$". With threads finer than 8 pitch, the possible variations would decrease further.

Figure 6:
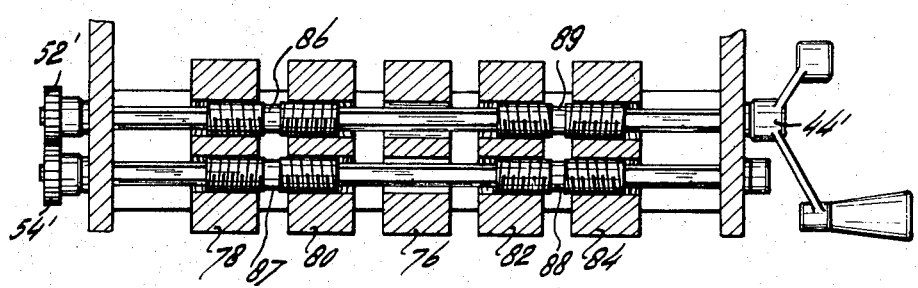
FIG. 6 is a schematic view of a modification involving an odd number of spindle blocks, the central block being stationary and the two pairs of blocks on either side laterally moving with respect to the central block.
Figure 7:
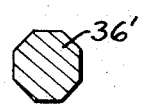
FIG. 7 is a transverse sectional view, showing an octagonal lateral adjusting rod modification.
Figure 8:
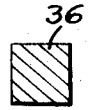
FIG. 8 is a transverse section, showing a rectangular lateral adjusting rod modification.

The proposed arrangement is adaptable to any number of spindle blocks having lateral shifting requirements. If an odd number of blocks is to be used, the modification shown schematcially in FIG. 6 may be employed. In this arrangement, the central block 76 is stationary, having non-threaded adjusting rod channels which simply slide upon the rotating rods. The blocks 78 and 80 engage identical adjusting sleeves 86 and 87, and the blocks 82 and 84 engage identical adjusting sleeves 88 and 89. As a result, the outer blocks are moved laterally with respect to each other and the central block as the rods are rotated. Also, of course, if bigger spindle blocks are used and shorter travel is required, a single shaft and shorter adjustment sleeve could be employed.

Manifestly, the configuration of the spindle blocks and their positioning with respect to the adjustment shafts may be varied without departing from the spirit of the invention.

I claim:
1. A drill spindle shifting mechanism comprising:
   (A) a lateral movement channel defined by a pair of side plates and a pair of front and back plates extending between said side plates;
   (B) top and bottom lateral adjusting rods extending through said lateral movement channel and rotatably secured at each end in said side plates, said rods including meshing gears at one end, so that turning of one rod in one direction drives said other rod in the opposite direction;
   (C) a plurality of top and bottom adjusting sleeves mounted respectively upon said top and bottom rods, said sleeves having right-hand threads at one end and left-hand threads at their other end and said sleeves being mounted upon said lateral adjusting rods in vertically staggered relationship, so that right-hand thread and left-hand thread portions on opposed sleeves are vertically aligned;
   (D) a plurality of spindle blocks mounted on said rods, each said block including a threaded top channel engaging said top sleeve threads of one type and a threaded bottom channel engaging said sleeve threads of another type, such that rotating of said rods moves said spindle blocks laterally upon said sleeves and in said channel.

2. A drill spindle shifting mechanism as in claim 1, each said adjusting sleeve engaging two adjacent spindle blocks.

3. A drill spindle shifting mechanism as in claim 2, one of said lateral adjusting rods having a hand crank supported at its free end.

4. A drill spindle shifting mechanism as in claim 3, said spindle blocks being dovetailed fore and aft so as to slidably engage said front and back support plates.

5. A drill spindle shifting mechanism as in claim 4, said spindle blocks including a drill spindle aperture extending vertically through the front of said block, said lateral adjustment rods extending horizontally through the back of said spindle block.

6. A drill spindle shifting mechanism as in claim 5, said spindle blocks being six in number, and said bottom lateral adjusting rod having peripheral threads at either end respectively engaging said threaded bottom apertures in the outer spindle blocks.

7. A drill spindle shifting mechanism as in claim 6, said lateral adjusting rods being hexagonal and said sleeves being slidable thereon.

8. A drill spindle shifting mechanism as in claim 6, said lateral adjusting rods being rectangular.

9. A drill spindle shifting mechanism as in claim 6, said lateral adjusting rods being octagonal.

10. A drill spindle shifting mechanism comprising:
   (A) a lateral movement channel defined by a pair of side plates and a pair of front and back dovetail plates extending between said side plates;
   (B) top and bottom lateral adjusting rods extending through said lateral movement channel and rotatably secured at each end in said side plates, said rods including meshing gears at one end, so that turning of one rod in one direction drives said other rod in the opposite direction;
   (C) a plurality of top and bottom adjusting sleeves mounted respectively upon said top and bottom rods, said sleeves having right-hand threads at one end and left-hand threads at their other end and said sleeves being mounted upon said lateral adjusting rods in vertically staggered relationship, so that right-hand thread and left-hand thread portions on opposed sleeves are vertically aligned;
   (D) a plurality of spindle blocks mounted on said rods, including a central spindle block being mounted immovably and a reminder of side blocks being mounted movably and in pairs on either side of said central block, each said side block including a threaded top channel engaging said top sleeve threads of one type and a threaded bottom channel engaging said sleeve threads of another type, such that rotating of said rods moves said spindle blocks laterally upon said rods and in said channel.

References Cited

UNITED STATES PATENTS 3,200,672  8/1965  Kawasaki ------------ 77—24

FRANCIS S. HUSAR, Primary Examiner

U.S. Cl. X.R.

144—110